United States Patent [19]
Baux et al.

[11] Patent Number: 5,284,055
[45] Date of Patent: Feb. 8, 1994

[54] DEVICE FOR MEASURING THE FUEL LEVEL IN A MOTOR VEHICLE TANK

[75] Inventors: Christian Baux, Levallois-Perret, France; Simon Bach, Bishops Tachbrook, Great Britain; Thierry Salaun, Montsoult, France

[73] Assignee: Jaeger, France

[21] Appl. No.: 853,498

[22] Filed: Mar. 18, 1992

[30] Foreign Application Priority Data

Mar. 19, 1991 [FR] France ............... 91 03313

[51] Int. Cl.⁵ ............................................. G01F 23/32
[52] U.S. Cl. ........................................ 73/317; 73/313; 338/33
[58] Field of Search ................ 73/317, 313; 340/625; 338/33

[56] References Cited

U.S. PATENT DOCUMENTS

| | | |
|---|---|---|
| 2,325,582 | 8/1943 | Anderson ............... 73/317 |
| 3,449,955 | 6/1969 | Stadelmann ............... 73/313 |
| 3,731,805 | 5/1973 | Schniers ............... 73/313 X |
| 3,925,747 | 12/1975 | Woodward et al. ............... 73/313 X |
| 4,939,932 | 7/1990 | Ritzenthaler et al. ............... 73/317 |
| 5,085,078 | 2/1992 | Baux et al. ............... 73/317 |

FOREIGN PATENT DOCUMENTS

| | | |
|---|---|---|
| 0403391 | 12/1990 | European Pat. Off. . |
| 0628151 | 10/1927 | France . |
| 2004064 | 3/1979 | United Kingdom . |

Primary Examiner—Daniel M. Yasich
Attorney, Agent, or Firm—Blakely, Sokoloff, Taylor & Zafman

[57] ABSTRACT

A device for measuring the level of fuel in a motor vehicle tank, the device being of the type comprising: a float suitable for following the level of the fuel; a lever hinged to a support and carrying the float; and an electrical transducer controlled by the lever so that the transducer supplies a signal representative of the level of fuel in the tank; wherein: the electrical transducer is placed in a fixed housing linked to a wall of the tank; the lever support is urged permanently against the bottom wall of the tank to follow any displacement thereof; and rotary link means are provided to provide a rotary connection between the float-carrying lever and a control shaft of the electrical transducer.

13 Claims, 2 Drawing Sheets

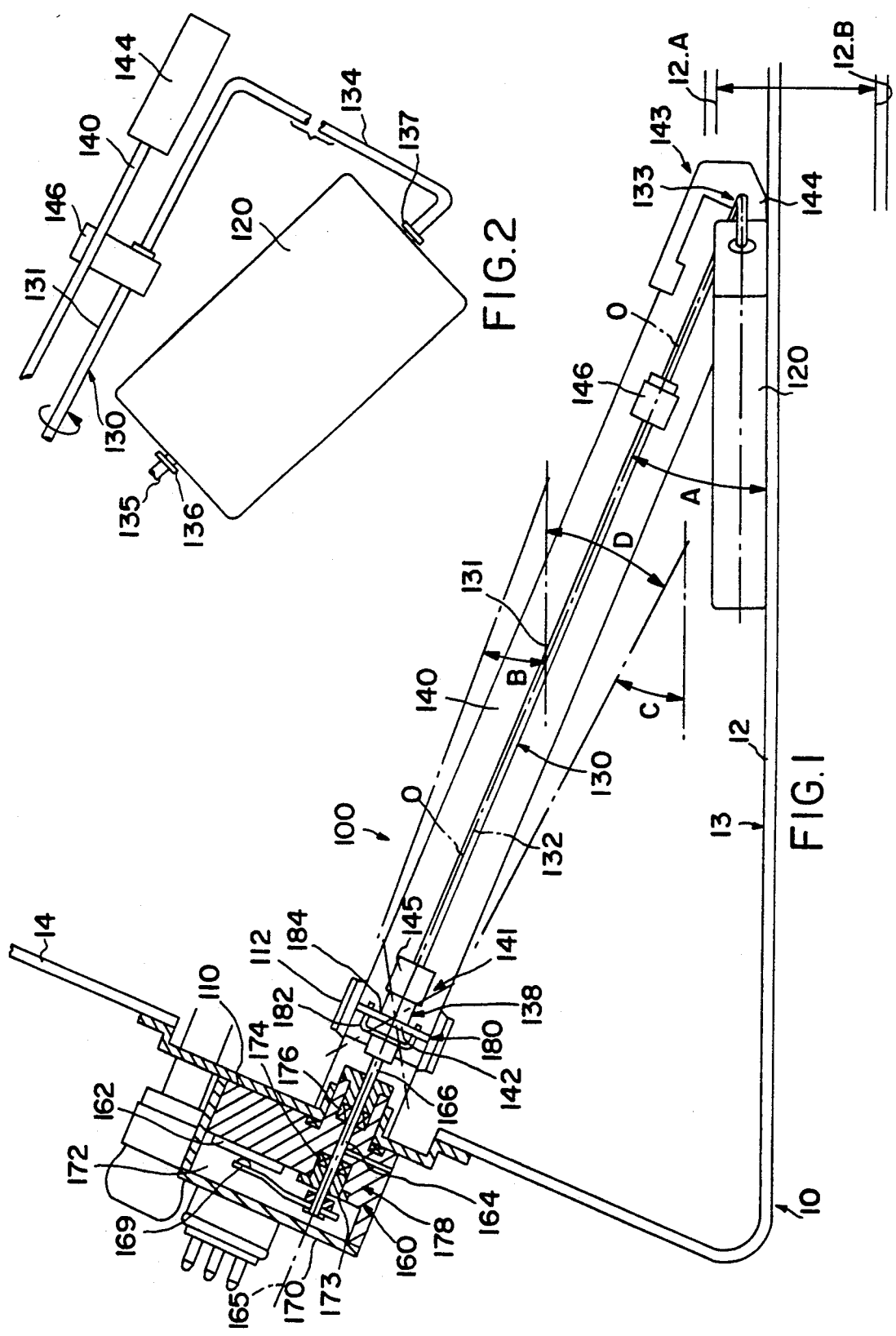

DEVICE FOR MEASURING THE FUEL LEVEL IN A MOTOR VEHICLE TANK

The present invention relates to a device for measuring the level of fuel in the tank of a motor vehicle.

It relates more precisely to fuel level measuring devices of the type comprising:

a float suitable for following the level of the fuel;

a lever hinged to a support and carrying the float; and an electrical transducer controlled by the lever so that the transducer supplies a signal representative of the level of fuel in the tank.

BACKGROUND OF THE INVENTION

It has been known for many years that fuel tanks may become deformed. This is particularly true when tanks are made of plastic. For example, the depth of the tank may vary significantly as a function of various parameters such as temperature, the weight of fuel in the tank, etc.

If precautions are not taken, tank deformations can give rise to erroneous fuel measurements, particularly when measuring a small quantity of fuel remaining in the bottom of a tank.

Errors can have severe consequences when the information from the electrical transducer is used to generate a warning signal informing the driver that the level in the tank has reached a minimum or "reserve" level. The effect of the above-mentioned error can lead to the warning being generated late. In other words, the device may indicate a quantity of fuel that is greater than the quantity actually in the tank.

Attempts have already been made to solve the above problem by means of devices that take their reference from the bottom of the tank.

Such devices are described, for example, in the following documents: US-A-4 184 370, DE-A-3 310 704, US-A-3 935 747, and US-A-3 449 955.

All of those known "bottom-reference" devices include means for urging the level-measuring assembly against the bottom of the tank, i.e. the assembly comprising the support for the float-carrying lever and the support for the electrical transducer.

Those known solutions lead to structures that are complex.

The object of the present invention is to improve existing systems.

SUMMARY OF THE INVENTION

According to the present invention, this object is achieved by a level-measuring device of the type comprising:

a float suitable for following the level of the fuel;

a lever hinged to a support and carrying the float; and an electrical transducer controlled by the lever so that the transducer supplies a signal representative of the level of fuel in the tank;

wherein:

the electrical transducer is placed in a fixed housing linked to a wall of the tank;

the lever support is urged permanently against the bottom wall of the tank to follow any displacement thereof; and rotary link means are provided to provide a rotary connection between the float-carrying lever and a control shaft of the electrical transducer.

BRIEF DESCRIPTION OF THE DRAWINGS

Embodiments of the invention are described by way of example with reference to the accompanying drawings, in which:

FIG. 1 is a diagrammatic vertical section through a tank including a level-measuring device of the present invention;

FIG. 2 is a fragmentary plan view as seen from above of the same level-measuring device;

DETAILED DESCRIPTION

Figure 1B:
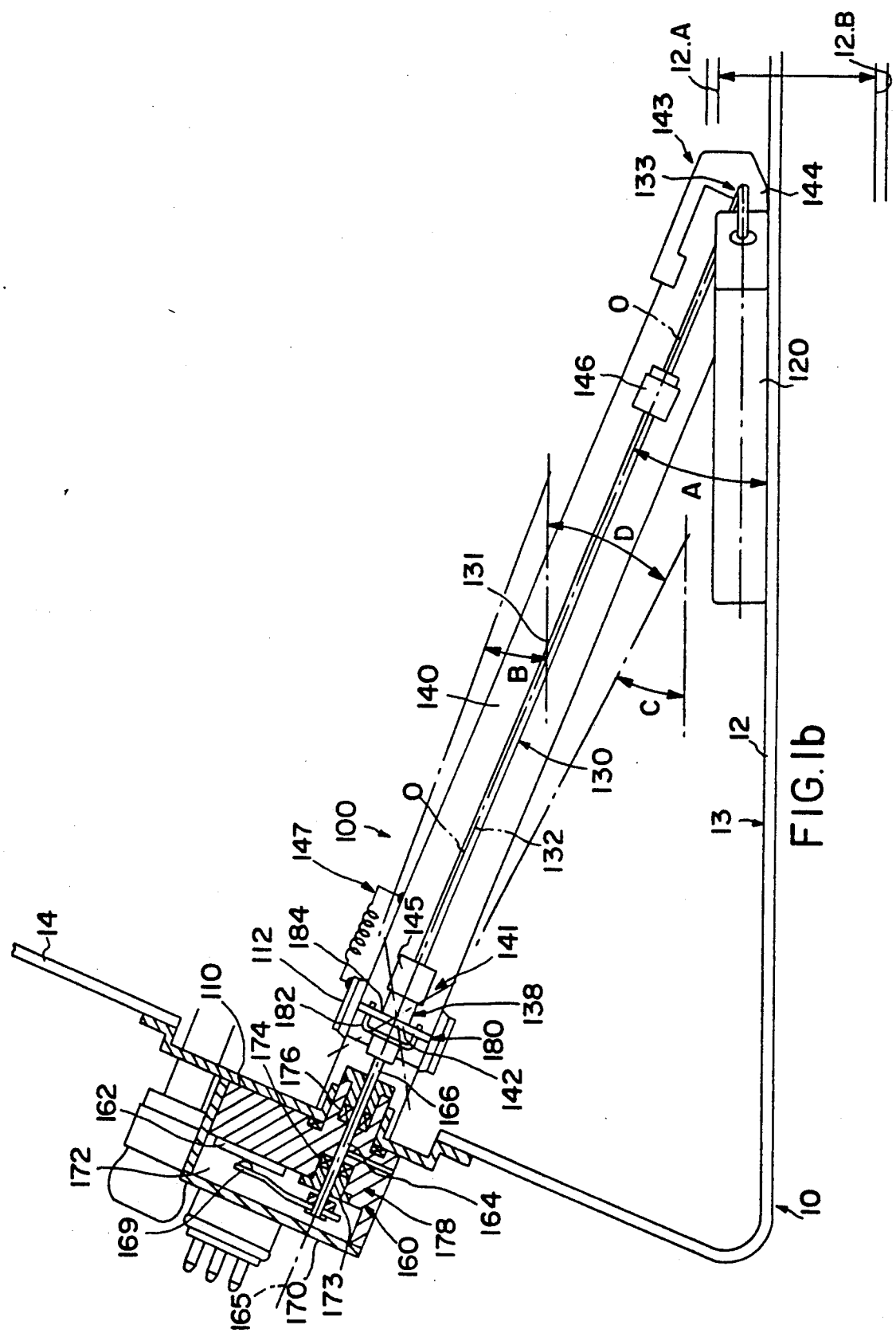
FIG. 1b is a diagrammatic vertical section through a tank fitted with a level-measuring device constituting a first variant embodiment of the present invention.

The preferred embodiment as shown in accompanying FIGS. 1 and 2 is described initially.

In FIGS. 1 and 2, the tank that is shown in part is given overall reference 10, while the level-measuring device is given overall reference 100.

More precisely, in FIG. 1, there can be seen a generally horizontal bottom wall 12 of the tank 10 and a side wall 14 thereof. In FIG. 1, the side wall 14 slopes relative to the vertical. However, in a variant said wall 14 could be vertical, i.e. orthogonal to the bottom wall 12.

In the embodiment shown in FIGS. 1 and 2, the level-measuring device 100 is supported by the side wall 14.

More precisely, the level-measuring device 100 is fixed to a base 110 which is itself fixed to the side wall 14.

The level-measuring device 100 shown in FIGS. 1 and 2 essentially comprises a float 120, a float-supporting lever 130, a support component 140 supporting the lever 130, and an electrical transducer 160.

The support component 140 is an elongate rigid component. The support component 140 is preferably in the form of a plane rectilinear blade.

The component 140 is hinged at its top end 141 to the base 110 about a horizontal axis 142.

More precisely, the support component 140 is hinged about the axis 142 which is supported by a tab 112 or any other equivalent means on the base 110.

The tab 112 projects into the tank 10 from the base 110.

The bottom end 143 of the support component 140 (i.e. its end opposite from the axis 142) is provided with a shoe 144 which permanently rests on the top surface 13 of the bottom wall 12 of the tank.

The bottom end 143 of the support component 140 may be urged against the bottom of the tank 12 merely by gravity as shown in FIG. 1 or optionally by a spring component 147 interposed between the tab 112 and the support component 140 as shown, in FIG. 1b.

Thus, in the embodiment shown in accompanying FIG. 1, the longitudinal axis O—O of the support component 140 slopes relative to the horizontal at a mean angle A of about 25°.

To the right of FIG. 1, two positions 12.A and 12.B are sketched showing respectively the highest position and the lowest position that may be occupied by the bottom wall 12 of the tank in the event of the tank becoming deformed. The person skilled in the art will readily understand from the above-described dispositions that the shoe 144 provided at the bottom end 143 of the support component 140 follows the bottom 12 of the tank. To do this, the support component 140 pivots about the axis 142 on the tab 112.

As a result, when the bottom 12 of the tank is in its high position 12.A, the longitudinal axis O—O of the support component 140 is at an angle B relative to the horizontal that is smaller than above-mentioned angle A. Conversely, when the bottom 12 of the tank is in its low position 12.B, the longitudinal axis O—O of the component 140 is at an angle C relative to the horizontal that is greater than above-mentioned angle A.

The deflection of the longitudinal axis O—O of the support component 140 between its high position and its low position is referenced D in FIG. 1.

The lever 130 is mounted on the support component 140, in a way that permits the main member 131 of the lever 130 to pivot around the main member's own longitudinal axis 132.

More precisely, the lever 130 comprises a main member 131. This member 131 is rectilinear. It extends parallel to the longitudinal axis O—O of the support component 140. The main member 131 is mounted on the support component 140 to pivot about its own longitudinal axis 132 which lies parallel to the longitudinal axis O—O of the support component 140. The axis 132 of the lever 130 is perpendicular to the pivot axis 142 of the support component 140.

The main length 131 of the lever 130 may be supported on the component 140 by any suitable conventional means. In the particular embodiment shown in the accompanying figures, the main member 131 of the lever 130 is mounted to pivot on the support component 140 by two bearings 145 and 146 provided respectively close to the top end 141 of the support component 140 and close to the bottom end 143 thereof.

The bottom end 133 of the main member 131 is bent at least in a first direction to carry the float 120. More precisely, in the preferred embodiment shown in FIGS. 1 and 2, the main member 131 is extended at its bottom end 133 by two bends to form an intermediate member 134 and an end length 135 on which the float is mounted.

The intermediate member 134 is bent substantially at right angles to the main member 131. The float-carrying end member 135 is bent at about 70° relative to the intermediate member 134, and seen in a vertical projection, by about 25° relative to the longitudinal axis 132 of the main member 131. The free end of the end member 135 converges towards the main length 131.

Naturally, the lever 130 may be implemented in numerous different ways as a function of the shape of the tank 10 and of the looked-for level-measuring curve.

The float 120 may be made in numerous different ways. The particular embodiment shown in FIGS. 1 and 2 has the float-supporting end member 135 passing through the float 120 in such a manner as to leave the float 120 free to rotate about said member 135. The float 120 is centered on the member 135.

The float 120 is prevented from moving in translation relative to the supporting end length 135 by any suitable conventional means, for example by washers 136 and 137 placed on the member 135 on either side of the float 120 and associated with stampings formed on the float.

The person skilled in the art will readily understand that when the liquid level rises or falls inside the tank 10, the float 120 follows the level of the liquid, and consequently since the float 120 is disposed eccentrically relative to the longitudinal axis 132 of the lever 130, the lever rotates about its longitudinal axis 132 in the bearings 145 and 146.

The electrical transducer 160 may be made in numerous different ways.

However, it is preferable for the transducer to be a resistive transducer.

More precisely, the electrical transducer 160 comprises a resistor component associated with a slider. The slider may be fixed to the base 110 and a resistive track may be driven by the lever 130.

However, it is preferable, as shown in FIG. 1, for the electrical transducer 160 to comprise a resistive track 162 fixed on the base 110 and an electrically conductive slider 169 which is movable over the resistive track 162 and which is carried for this purpose on a shaft 164 designed to be driven by the lever 130.

More precisely, the resistive track 162 preferably comprises a resistive track in the form of a circular sector centered around the axis 165 of the shaft 164. The axis 165 extends perpendicularly to the side wall 14 carrying the base 110. The resistive track 162 is placed in a housing 170 that is secured to the base 110. The slider 169 resting against the track 162 is provided at one of the ends of the shaft 164. The slider 169 extends generally perpendicularly to the axis 165 of the shaft 164. The resistive track 162 and the associated slider 169 are placed in a first sealed chamber 172 of the housing 170. The shaft 164 passes through the wall 173 of the chamber 172. Sealing is provided at this point by a first O-ring 174 engaged on the shaft 164 and carried by the wall 173. The shaft 164 then passes through the base 110 via a second O-ring 176 placed on the shaft 164 and carried by the base 110. The end 166 of the shaft 164 opposite from the slider 169 is thus located inside the tank 10 and may co-operate with the lever 130 to displace the slider 169 over the resistive track 162.

The interstitial chamber 178 formed between the O-rings 174 and 176 is preferably exposed to the atmosphere. The above dispositions (sealed chamber housing a resistive track 162 and the associated slider 169, and an intermediate chamber 178 connected to the atmosphere with two sealing rings 174 and 176 on the slider-driving shaft 164) provide good insulation between the resistive track 162 and the fuel, and in particular the fuel vapor contained in the tank 10. The resistive track 162 is thus fully protected from the fuel vapor and is therefore insensitive thereto.

Means are provided between the end 166 of the shaft 164 located inside the tank 10 and the top end 138 of the lever 130 for imparting rotation from the float-carrying lever 130 to the slider-carrying shaft 164.

The above-mentioned means also provide a jointed connection between the float-carrying lever 130 and the slider-carrying shaft 164 that allows for angular displacement therebetween about the axis 142.

As shown in FIG. 1, it is preferable for the axes 165 and 132 to be in alignment when the tank bottom 12 is in its mean position. However this configuration is not essential, and in the mean position, the axes 165 and 132 may be parallel rather than being in alignment.

These means providing a jointed connection with allowance for relative angular deflection may be constituted by any conventional structure known to the person skilled in the art.

By way of non-limiting example, the following means may be mentioned: a device comprising pegs and fingers, devices having teeth, devices with claws, devices having fingers and keys, devices comprising cranks and crank arms, devices with resilient links, universal joint devices, flexible devices. All such drive devices for transmitting continuous circular motion of one shaft (in this case the float-carrying lever 130) into continuous circular movement of another shaft lying substantially in line therewith (in this case the slider-supporting shaft 164) are well known to the person skilled in the art and are therefore not described in detail below. As a reference, it may be mentioned that these drive means are described, for example, in the work entitled "Accouplements, joints de cardans et encliquetages" ("Couplings, universal joints, and catches") by J. Brondel, published by Dunod, Paris, 1961.

In the particular embodiment shown in FIG. 1, the drive means 180 provided between the end 166 of the shaft 164 inside the tank 10 and the top end 138 of the lever 130 are of the universal or Hooke's joint type.

More precisely, as can be seen in FIG. 1, there is a two-fork structure 182 connected to the end 166 of the shaft 164 and designed to receive a drive finger 184 connected to the end 138 of the lever 130. The two forks of the structure 182 are symmetrical about the axis 165 of the shaft 164 and parallel thereto. The drive finger 184 extends perpendicularly to the longitudinal axis 132 of the lever 130.

Naturally, an alternate structure could be used. I.e. the drive finger could be connected to the end 166 of the shaft 164 and the complementary fork structure would be provided at the end 138 of the lever 130. The universal joint type structure 180 connecting the end 166 of the shaft 164 to the end 138 of the lever 130 may be constituted by any of the various types of universal joint known to the person skilled in the art.

According to an advantageous characteristic of the present invention, the pivot axis 142 connecting the support component 140 to the base 110 passes through the axis of the drive finger 184 and coincides with the cross-section point between the axes 165 and 132.

Because of this disposition, the slider 169 occupies always at least substantially the same origin position when the float 120 is resting against the bottom 12 of the tank.

The operation of the level-measuring device shown in accompanying FIGS. 1 and 2 is essentially as follows.

When the level of fuel in the tank 10 varies, the float 120 follows it. Consequently, changes in the level of fuel in the tank 10 give rise to the lever 130 pivoting about its longitudinal axis 132. This rotary motion of the lever 130 is communicated to the shaft 164 by the universal joint type structure 180. Thus, the position of the slider 169 on the resistive track 162 varies as a function of the level of liquid in the tank 10. The information taken from the terminals of the resistive component 162 is thus directly representative in known manner of the level of liquid in the tank.

If the bottom 12 of the tank 10 is deformed as shown at 12.A or 12.B to the right of FIG. 1, then the shoe 144 of the support component 140 follows the deformation. Consequently, the support component 140 pivots about the axis 142. However, given the configuration of the means 180 interposed between the lever 130 and the shaft 164, such deformation of the bottom 12 of the tank has no effect on the position of the slider 169. In other words, regardless of the position of the bottom 12 of the tank, for given level of fuel in the tank 10, the slider always occupies at least substantially the same position relative to the resistive track 160. Under such conditions, the information delivered by the electrical transducer 160 remains the same, for any given level of fuel in the tank, regardless of the deformation of the tank, if the tank is empty the float rests at the bottom wall of the tank. The presence of fluid in the tank causes the float to be lifted from the bottom wall of the tank, thereby causing the main member 131 of the lever 130 to twist about the main member's main axis 132. The rotational motion is transmitted to shaft 164 through the universal joint structure. As the shaft 164 turns about its axis 165, it moves the slider 169 relative to the resistive track 162, thereby providing a signal indicating the fluid level in the tank.

Naturally, the present invention is not limited to the particular embodiments described above, but extends to any variant that comes within the spirit of the invention.

What is claimed is:

1. A device for measuring the level of fuel in a motor vehicle tank, the device comprising:
   a float suitable for following the level of the fuel;
   a base fixedly attached to a wall of the tank;
   a housing fixedly attached to the base;
   an electrical transducer provided in said housing, the transducer comprising:
   a resistive track, and
   a slider;
   a shaft having a first end, a second end and a rotation axis, the first end of the shaft projecting in the tank, the second end of the shaft coupled to the slider of the transducer, the shaft being mounted to the base so that the rotation axis of the shaft intersects the wall of the tank that the base is fixedly attached to and the shaft can rotate about the rotation axis of the shaft,
   a support component having a longitudinal axis and top and bottom ends, the bottom end of the support component disposed inside the tank, the top end of the support component being attached to the base so that it can pivot about a horizontal axis perpendicular to said longitudinal axis of the support component and to said rotation axis of said shaft;
   urging means for permanently urging the bottom end of said support component against a bottom wall of the tank to follow any displacement thereof;
   a lever comprising
   a main member having a top end, a bottom end, and a longitudinal axis, the main member mounted on the support component so that the longitudinal axis of the main member is disposed parallel to the longitudinal axis of the support component, the bottom end of the main member being substantially adjacent to the bottom end of the support component, the main member mounted on the support component so that the main member can pivot about the main member's longitudinal axis, and
   at least an auxiliary member having a first end, a second end, and a longitudinal axis, the second end of the auxiliary member fixedly attached to the bottom end of said main member, the longitudinal axis of the auxiliary member disposed at an angle to the longitudinal axis of the main member,
   means for connecting the float to the first end of the auxiliary member of the lever; and
   a universal joint type structure substantially adjacent to the top end of the support component, the universal joint type structure coupling the first end of the shaft to the top end of the lever so that:
   when the float moves causing the main member of the lever to rotate about the longitudinal axis of the main member of the lever, the shaft is caused to rotate about the rotation axis of the shaft so that the transducer supplies a signal representative of the level of fuel in the tank, and the lever is allowed to pivot about said horizontal axis when the support component pivots about said horizontal axis.

2. The device of claim 1 wherein the base is fixedly attached to a side wall of the tank.

3. The device of claim 1 wherein said bottom end of the support component is urged against the bottom wall of the tank by gravity.

4. The device of claim 1 wherein the urging means comprises a spring.

5. The device of claim 1 wherein said auxiliary member of the lever is bent in two substantially linear components, the first component being attached to and disposed at substantially right angles to the main member of the lever and the second component being attached to and disposed at an angle to the first component, the float being fixedly attached to the second component.

6. The device of claim 1 further comprising sealing means around said shaft.

7. The device of claim 6 wherein said sealing means comprises at least an O-ring.

8. The device of claim 6 wherein said sealing means comprises at least two O-rings defining an interstitial chamber between them.

9. The device of claim 8 wherein the interstitial chamber is exposed to the atmosphere.

10. The device of claim 1 wherein said universal joint structure comprises a first and a second fork, the first fork connected to the shaft, the second fork connected to the lever, and a drive finger received within said forks.

11. The device of claim 1 wherein the longitudinal axis of the lever intersects said horizontal axis.

12. The device of claim 1 wherein the resistive track fixedly attached to the housing and the slider is fixedly attached to the shaft.

13. The device of claim 1 wherein the resistive track is fixedly attached to the shaft and the slider is fixedly attached to the housing.

* * * * *